United States Patent [19]

Tamaru et al.

[11] Patent Number: 5,345,580
[45] Date of Patent: Sep. 6, 1994

[54] MICROPROCESSOR DEVICE AND EMULATOR DEVICE THEREOF

[75] Inventors: Kiichiro Tamaru, Tokyo; Yoko Ookita, Yokohama, both of Japan

[73] Assignee: Kabushiki Kaisha Toshiba, Kawasaki, Japan

[21] Appl. No.: 798,720

[22] Filed: Nov. 29, 1991

[30] Foreign Application Priority Data

Nov. 29, 1990 [JP] Japan .................................. 2-325739
Nov. 27, 1991 [JP] Japan .................................. 3-311219

[51] Int. Cl.⁵ ............................................ G06F 11/00
[52] U.S. Cl. .............................. 395/500; 364/232.3; 364/239; 364/DIG. 1
[58] Field of Search ............................ 395/500, 375

[56] References Cited

U.S. PATENT DOCUMENTS 4,231,087 10/1980 Hunsbeyer et al. ................ 395/575
4,636,941 1/1987 Suko .................................... 395/575
4,674,089 6/1987 Ponet et al. ......................... 371/16.2
4,789,924 12/1988 Fukuta ................................. 395/500

Primary Examiner—Parshotam S. Lall
Assistant Examiner—Ayni Mohamed
Attorney, Agent, or Firm—Foley & Lardner

[57] ABSTRACT

A microprocessor device has an operand address register for storing an operand access address for an operand access, an access generation instruction address register for storing an access generation instruction address having caused the operand access and an operand data register for storing input/output data for the address indicated by the operand address. A multiplexer, whose operation is controlled by a selection signal provided from outside of the microprocessor, outputs the operand address or the access generation instruction address to an address pin of the microprocessor. An emulator device includes the above microprocessor device and a hold circuit, connected to the address pin in the microprocessor, for holding the data output from the microprocessor through the address pin. An address signal line is connected to the hold circuit. A trace memory stores the information transferred through the address pin as trace information during a real-time trace operation. A trace control circuit generates the selection signal and the hold signal to the hold circuit and generates a store signal. The hold circuit outputs the operand address to the address signal line when the hold signal and the selection signal are in the enable state.

14 Claims, 7 Drawing Sheets

MICROPROCESSOR DEVICE AND EMULATOR DEVICE THEREOF

BACKGROUND OF THE INVENTION

1. Field of the Invention

This invention relates to a microprocessor device and an emulator device used for the microprocessor application device, and, in particular, relates to a microprocessor with an improved configuration and an emulator with an improved configuration by which simple debugging can be carried out for the development of a microprocessor application system.

2. Description of the Prior Art

An emulator device as a system for assisting in debugging during the development of a microprocessor application system is commonly known. This emulator device controls the operation of a microprocessor device (hereinafter referred to as "microprocessor") incorporated in the microprocessor application system. In addition, it assists the debugging of the microprocessor application system by observing the operational state of the microprocessor.

In particular, one of the important functions of the emulator device is real-time tracing for observing microprocessor operations in real time. Trace information is information about a real-time tracing operation. The trace information is generated only from information obtained by observing a chip bus in the microprocessor because the microprocessor operations are observed under real-time conditions. The relationship between the execution of an instruction and instruction fetch and operand access in a microprocessor with a simple configuration is uncomplicated, therefore the trace information can be readily obtained by merely observing the instruction and operand information on the chip bus.

On the other hand, methods such as prefetching of an instruction and operand and buffering for writing an operand are widely used in a high performance microprocessor. The relationship between the order in which the instructions are executed and the order in which the operands are accessed becomes complex when these methods are used in such a high performance microprocessor. Accordingly, the analysis of the operational state of the microprocessor by merely observing the information on the chip bus is too difficult. In this case, debugging of the application system incorporating the high performance microprocessor is also difficult.

Problems associated with the conventional microprocessor and emulator device will now be explained. For example, instructions and operands are generally prefetched for high-speed operation based on a pipeline processing method in a conventional high-performance microprocessor. Such a microprocessor comprises a plurality of prefetch queues for temporarily storing prefetched instructions and operands. Then, prefetched instructions other than branch instructions stored in the prefetch queues are executed in the order in which they are stored. The prefetched operands in the queues are used for the prefetching instructions.

All data in the queues is purged, and the instructions and operands stored in the queues after the execution of a branch instruction are eliminated when the result of the executed branch instruction is true. In this case, the eliminated instructions and operands are not executed by the microprocessor. The conventional microprocessor has no means for outputting information about the eliminated instructions and operands to an external device.

A microprocessor for evaluation of chips which can output to an external device information about executed instructions and operands used is known. However, in addition to the address bus, this microprocessor has an output bus used only for outputting this information. In this case, an additional pin is required in the microprocessor for outputting this information so that the total number of pins in the microprocessor is greater than in a microprocessor which has no such dedicated output bus.

As described above, a conventional microprocessor has no function by which information about eliminated instructions and operands is output to an external device. Therefore the following two problems exist in the prior art.

The first problem concerns the real-time trace function which is an important function in the emulator device. Input/Output signals are stored in memory in accordance with a predetermined timing cycle by the real-time trace function, and the contents stored in the memory are then analyzed for display.

All instructions stored in the queues are purged on the execution of a branch instruction in the prefetched instructions when the result of the branch instruction execution is true in a microprocessor with a prefetch function, and there is no target instruction for the branch instruction in the queues. Further, the microprocessor fetches the target instruction for the branch instruction. In this case, the purged instructions are stored in the trace memory. Accordingly, actual executed instructions differ from those instructions stored in the trace memory.

The second problem is that the conventional microprocessor has no means for detecting whether the result of the branch instruction execution is true or not. For example, the microprocessor executes no fetch instruction when the target instruction for the branch instruction is stored in the queues and the result of the branch instruction execution is true. Accordingly, information as to whether the result of the branch instruction execution is true or not cannot be transmitted externally. In other words, a device external to the microprocessor is required to detect the result of the branch instruction execution. However, this external device cannot detect which branch instruction has been executed and whether the result is true or not when a large number of branch instructions, each of whose target addresses is same when the result of each branch instruction is true, are stored in the queues and many of these branch instructions are executed.

On the other hand, the two problems described above can be eliminated when the evaluation microprocessor is an evaluation chip with an output bus for outputting the information from an executed program counter (PC). However, the configuration of this evaluation microprocessor differs from the configuration of a microprocessor used in actual microprocessor application systems.

SUMMARY OF THE INVENTION

An object of the present invention is to provide a microprocessor device which is capable of outputting emulator support information, for example an operand address and an access generation instruction address having caused the operand access to an outside device such as an emulator device of the microprocessor. The configuration of this microprocessor device is equivalent to that of a microprocessor incorporated in an actual user's system.

Another object of the present invention is to provide an emulator device, in which incorporating the improved microprocessor device described above can be incorporated at an emulator test operation as an actual chip, with a real-time trace function for storing the emulator support information provided from the microprocessor, by which the internal state of the microprocessor can be analyzed correctly.

As a preferred embodiment according to the present invention, a microprocessor device comprises:

an operand address register for storing an operand access address for an operand access;

an access generation instruction address register for storing an access generation instruction address having caused the operand access;

an operand data register for storing input/output data for the address indicated by the operand address;

selection means, operation of which is controlled by a selection signal provided from outside of the microprocessor, for inputting the operand address output from the operand address register and the access generation instruction address output from the access generation instruction register as an input signal, for outputting one of the operand address and the access generation instruction address as an output signal; and output means for outputting the output signal selected by the selection means to outside of the microprocessor.

In the microprocessor device, for example, the output means is an address pin.

Further, in the microprocessor device, the selection means outputs the operand address as the output signal when the selection signal is in an enable state, and the selection means selects either the operand address or the access generation instruction address having caused the operand access with a predetermined timing and outputs one of them as the output signal when the selection signal is in a disable state.

In addition, in the microprocessor device, the selection means outputs the operand address as the output signal when the selection signal is in an enable state, and the selection means outputs the operand address and the access generation instruction address having caused the access operation as the output signal when the selection signal is in a disable state.

As another preferred embodiment according to the present invention, a microprocessor device comprising:

an operand address register for storing an operand access address for an operand access;

an access generation instruction address register for storing an access generation instruction address having caused the operand access;

an operand data register for storing input/output data for the address indicated by the operand address;

selection means, the operation of which is controlled by a selection signal provided from outside of the microprocessor, for inputting the operand data transferred from the operand data register and the access generation instruction address transferred from the access generation instruction register as input signals, and for outputting one of the operand data and the access generation instruction address as an output signal; and output means for outputting the output signal selected by the selection means to outside of the microprocessor.

Further, in the microprocessor device, the output means is an address pin.

In addition, in the microprocessor device, the selection means outputs the operand data as the output signal when the selection signal is in an enable state, and the selection means selects either the operand data or the access generation instruction address with a predetermined timing and outputs one of them as the output signal when the selection signal is in a disable state.

Furthermore, in the microprocessor device, the selection means outputs the operand data as the output signal when the selection signal is in an enable state, and the selection means outputs the operand data and the access generation instruction address as the output signal when the selection signal is in a disable state.

As another preferred embodiment according to the present invention, an emulator device comprising:

the microprocessor device described above;

hold means, connected to the address pin in the microprocessor, for holding the output data from the microprocessor through the address pin;

address output means connected to the hold means;

trace information storage means for storing the information transferred through the address pin and an input/output pin in the microprocessor for inputting/outputting the operand data, and the address output means as trace information at a real-time trace operation; and trace control means for generating the selection signal and for outputting the selection signal to the selection means in the microprocessor, for generating a hold signal and for outputting the hold signal to the hold means, and for generating a store signal and for outputting the store signal to the trace store means, wherein the hold means outputs the operand address to the address output means when both of the hold signal and the selection signal are in the enable state.

As another preferred embodiment according to the present invention, an emulator device comprising:

hold means for inputting an operand address transferred through an address pin in a microprocessor device incorporated in the emulator device during an emulation test operation, for temporarily holding the operand address for operand access;

trace information storage means for storing the operand address obtained through the address pin and an access generation instruction address having caused the operand access as trace information during a real time trace operation; and trace control means for outputting the selection signal with a predetermined timing, for outputting a hold signal indicating a timing to store the trace information to the hold means, and for outputting a store signal indicating a timing to store the trace information, wherein the hold means holds the input signal and outputs the input signal when the selection signal is in the enable state and the hold signal changes to the disable state, and for withholding the input signal when the state of the hold signal changes to the enable state, and for holding the access generation instruction address as the output signal transferred through the address bus from the microprocessor device when the selection signal and the hold signal are in the disable state.

As another preferred embodiment according to the present invention, an microprocessor device comprising:

an address generation section for generating an address for memory access operation:

an execution program counter (PC) register for indicating an execution PC to be executed in an arithmetic device;

a multiplexer for multiplexing either an output signal transferred from the address generation section or an output signal transferred from the execution PC register in synchronism with a change of a selection signal provided from outside of the microprocessor; and an address bus for outputting the output signal from the address generation section and the output signal from the execution PC register to outside of the microprocessor based on the control by the multiplexer, wherein the microprocessor is capable of outputting the output signal transferred from the address generation section when the selection signal in a disable state and capable of outputting alternately the output signal from the address generation section and the output signal from the execution PC register by multiplexing them to the address bus when the selection signal is in an enable state.

Further, in the microprocessor described above, the address generation section generates an operand address.

In addition, in the microprocessor, the address generation section generates an execution instruction address.

As another preferred embodiment according to the present invention, an emulator device comprising:

the microprocessor device described above;

hold means for temporarily storing the output signal transferred through the address bus in the microprocessor device; and trace information store means for storing the output signal transferred from the address generation section and the execution PC register through the address bus as trace information during a real-time trace operation, wherein the operation of the hold means is controlled by a hold signal indicating a timing to store the trace information, and the operation of the trace store means is controlled by a store signal indicating a timing to store the trace information, the hold means holds the output signal and outputs the output signal when the selection signal is in the enable state and the hold signal changes to the disable state, the hold means withholds the output signal when the hold signal changes to the enable state, and the trace information store means stores the execution instruction address as the output signal transferred from the microprocessor device through the address bus when the selection signal and the store signal are in the disable state.

As another preferred embodiment according to the present invention, an emulator device comprising:

hold means for temporarily storing the output signal transferred from an address generation section through an address bus in a microprocessor device incorporated in the emulator during an emulation test operation; and trace information store means for storing the output signal transferred from the address generation section and as execution PC register through the address bus as trace information at a real-time trace operation, wherein the operation of the hold means is controlled by a hold signal indicating a timing to store the trace information, and the operation of the trace store means is controlled by a store signal indicating a timing to store the trace information, the hold means holds the output signal and outputs the output signal when the selection signal is in the enable state and the hold signal changes to the disable state, the hold means withholds the output signal when the hold signal changes to the enable state, and the trace information store means stores the execution instruction address as the output signal transferred from the microprocessor device through the address bus when the selection signal and the store signal are in the disable state.

These and other objects, feature and advantages of the present invention will be more apparent from the following description of preferred embodiments, taken in conjunction with the accompanying drawings.

DETAILED DESCRIPTION OF THE EMBODIMENTS

Preferred embodiments according to the present invention will now be explained.

A low-enable state and a high-disable state are used in explanations for the following embodiments.

Figure 1:
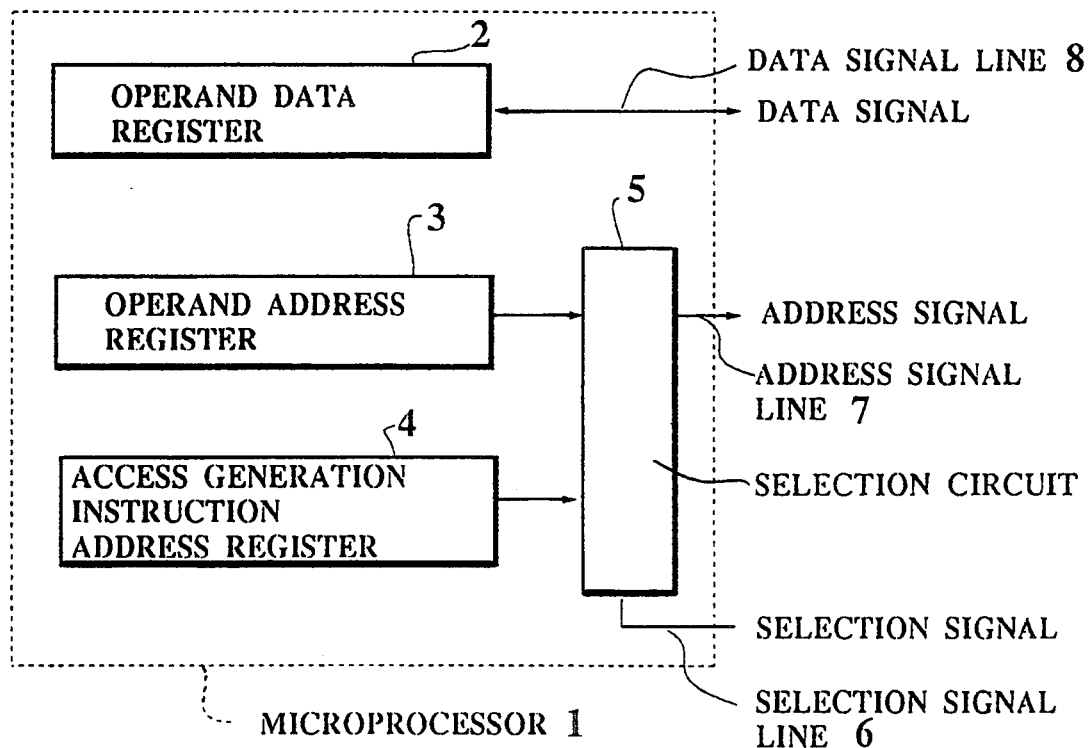
FIG. 1 is a block diagram of the configuration of a microprocessor device according to a first embodiment of the present invention.

FIG. 1 is a block diagram of the configuration of a microprocessor device (hereinafter referred to as "microprocessor") according to a first embodiment of the present invention.

The microprocessor 1 comprises an operand data register 2 for storing data required for operand access, an operand address register 3 for storing operand addresses used for operand access, an access generation instruction register 4 for storing an access generation instruction address, and a selection circuit 5 as a selection means for selecting the access generation instruction address in the access generation instruction address register 4 or the operand address in the operand address register 3 and for transferring one of them through an address pin (not shown) in the microprocessor 1 to an external device (not shown) from the microprocessor 1 by controlling a selection signal.

The operand access is caused by the access generation instruction indicated by the access generation instruction address.

The control signal is provided to the selection circuit 5 through the selection signal line 6, then transmitted to the external device. In general, a conventional microprocessor comprises the operand data register 2 and the operand address register 3.

The improved microprocessor according to the embodiment of the present invention further comprises the access generation instruction address register 4 and the selection circuit 5 in addition to the configuration of the conventional microprocessor.

Other signal lines required for operand access, for example, a data signal line, a control line, and the like, are signal lines used in the conventional microprocessor. In FIG. 1, a data signal line 8 is the signal line for inputting data to and outputting data from the operand data register 2.

In the microprocessor 1 having the configuration described above, the operand address in the operand address register 3 and the access generation instruction address by which the operand access has been generated, in the access generation instruction address register 4 can be transferred alternately to the external device under control of the selection signal which is provided externally.

Accordingly, the address (which is stored in the access generation instruction address register 4 as the access generation instruction address) of the instruction executed by the microprocessor 1 and the operand address related to the access generation instruction address (which is stored in the operand address register 3 as the operand address) can be supplied to the external device through the address signal line 7 by using a time sharing method based on a predetermined output timing of the selection signal when debugging the microprocessor 1. The debugging can therefore be easily accomplished.

The following configuration of the microprocessor according to the present invention is possible. For example, a terminal only for supplying the access generation instruction address stored in the access generation instruction address register 4 to the outside device (not shown) can be provided instead of the selection circuit 5. However, in this case, the number of terminals in the microprocessor is increased because a terminal for the data signal line 8 is required in addition to the terminals for the address signal line 7, and the selection signal line 6. In this case, the selection signal is also supplied to the operand address register 3 and the access generation instruction address register 4. This configuration of the microprocessor is not practical.

Next, another configuration of the microprocessor 1 shown in FIG. 1 will be explained. This configuration is provided without increasing the number of terminals in the microprocessor.

Figure 2:
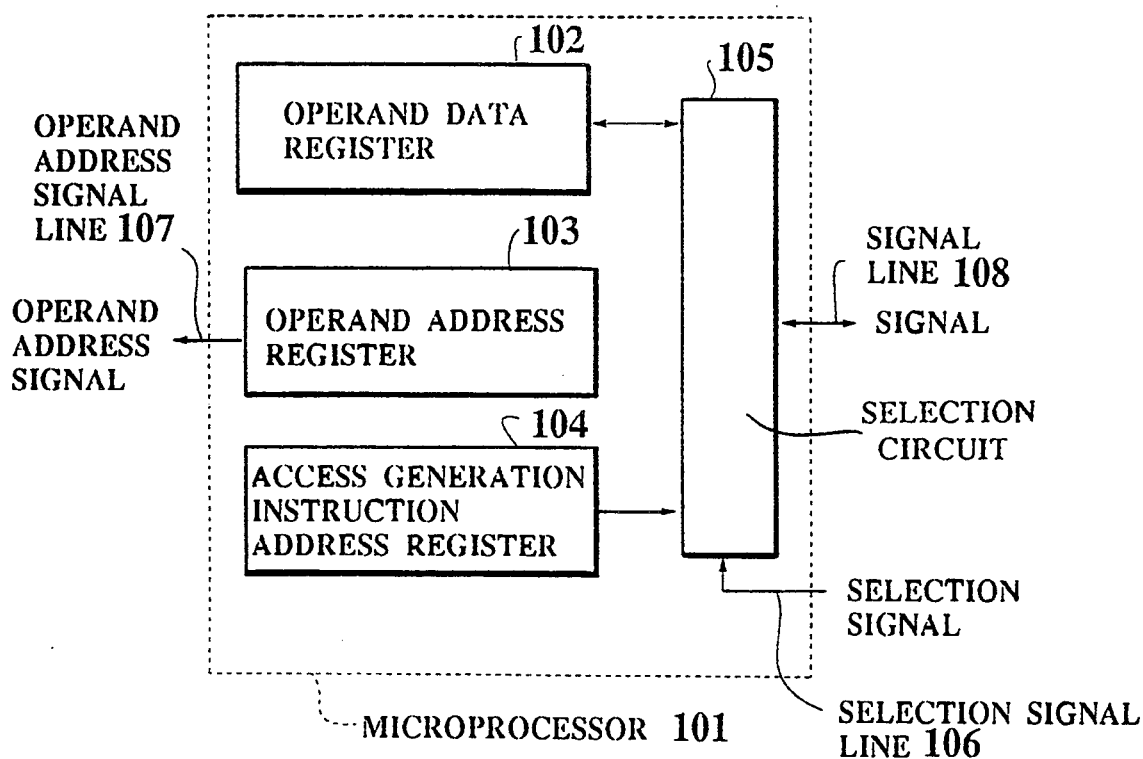
FIG. 2 is a block diagram of another configuration of a microprocessor device according to the first embodiment of the present invention.

FIG. 2 is a block diagram for another configuration of a microprocessor according to the present invention. In this diagram, a microprocessor 101 comprises an operand data register 102, an operand address register 103, an access generation instruction address register 104, and a selection circuit 105. The configuration of the microprocessor 101 is the same as that of the microprocessor 1 shown in FIG. 1 except that the selection circuit 105 is connected to the operand data register 102 and the access generation instruction address register 104.

The operand data and the executed instruction address are output alternately to the signal line 108 through the selection circuit 105 in the microprocessor 101 under control of the selection signal 106.

Figure 3:
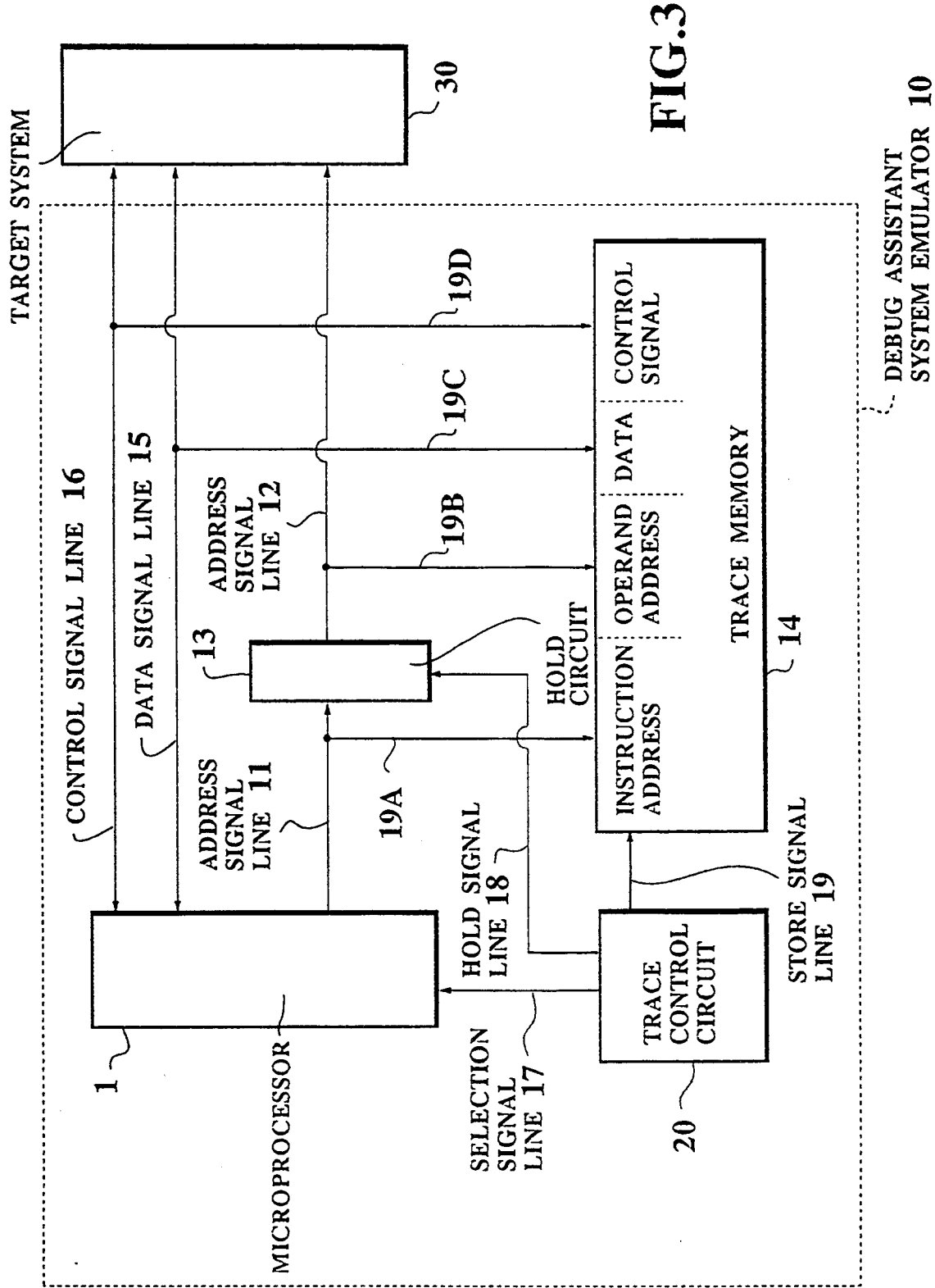
FIG. 3 is a block diagram of a configuration of an emulator device for the microprocessor device shown in FIG. 1 according to a second embodiment of the present invention.

FIG. 3 is a block diagram of a preferred configuration of an emulator device 10 as a debugging device for the microprocessors 1 according to a second embodiment of the present invention. In this diagram, an address signal line 11 is used for transferring the access generation instruction address and the operand address from the microprocessor 1. The address signal line 11 is connected to the address signal line 7 shown in FIG. 1 through the address pin in the microprocessor 1 (not shown).

The access generation instruction address and the operand address are transferred to a hold circuit 13 by the time sharing method through the address signal line 11. Only the operand address signal from the hold circuit 13 is transferred to a target system 30 through an address signal line 12. On the other hand, the access generation instruction address signal is transferred to a trace memory 14 through a signal line 19A. The trace memory 14 stores real-time trace information when a real-time trace operation is executed in the emulator device 10. The real-time trace information includes the operand address signal which is also transferred to a target system 30, the data signal transferred between the microprocessor 1 and the target system 30 through a data signal line 15, and a control signal on a control signal line 16 in addition to the access generation instruction address and the operand address. The chip bus in the emulator 10 comprises these lines and the like.

The selection signal on a selection signal line 17, a hold signal for controlling the operation of the hold circuit 13 on a hold signal line 18, a store signal for controlling a trace memory operation on a store signal line 19 are generated by a trace control circuit 20.

In the improved emulator device 10 according to the second embodiment of the present invention, the hold circuit 13 and the trace control circuit 20 differ from the configuration of a conventional emulator.

Figure 4:
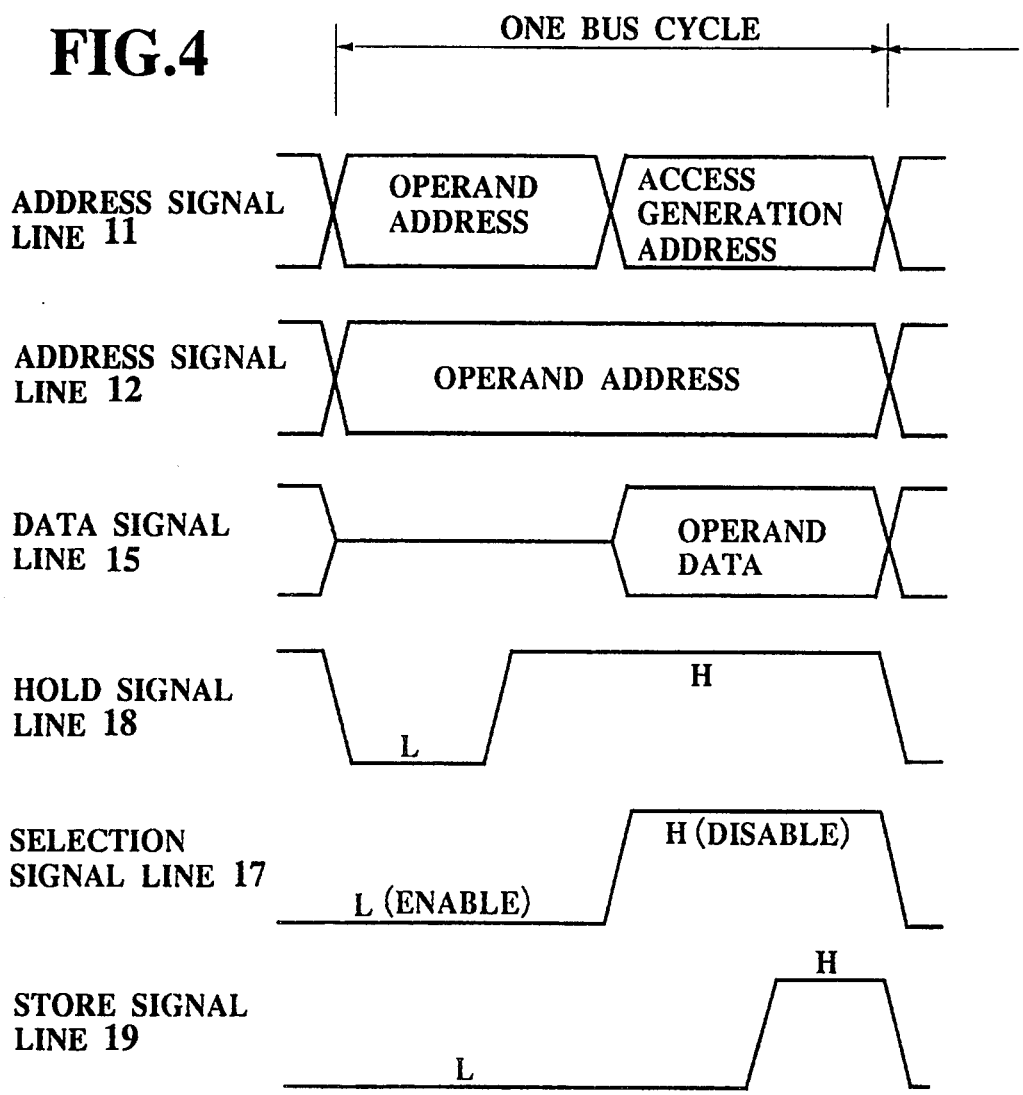
FIG. 4 is a timing chart showing the operation of the emulator device shown in FIG. 3.

FIG. 4 is a timing chart for the operation of the emulator device 10 shown in FIG. 3. The operation of the emulator device 10 will now be explained.

The microprocessor 1 outputs an operand address stored in the operand address register 3 on the address signal line 11 after operand access is started. At this time, the trace control circuit 20 outputs a low level selection signal to the microprocessor 1 through the selection signal line 17. The operand address is transferred from the operand address register 3 to the hold circuit 13 through the selection signal line 11 by the low level selection signal (the enable state) shown in FIG. 4. Further, the hold circuit 13 inputs the operand address from the microprocessor 1 and outputs the operand address to the target system 30 through the address signal line 12 while the trace control circuit 20 is outputting the low level hold signal to the hold circuit 13 through the hold signal line 18 and the selection signal is at the low level (the enable state).

Next, the hold circuit 13 stores the operand address signal transferred from the microprocessor 1 and then outputs this operand address on the address signal line 12 when the hold signal enters the high level. The operand address is output from the hold circuit 13 to the target system 30. Thereby, the operand address is provided to the target address 30 during the one bus cycle.

The control circuit 20 outputs the high level selection signal on the selection signal line 17 after the operand address is stored in the hold circuit 13. The microprocessor 1 receives the high level selection signal (the disable state), then outputs the access generation instruction address stored in the access generation instruction address register 4 on the address signal line 11. Next, the access generation instruction address is stored in the trace memory 14 as trace information from the hold circuit 13 when the operand data on the data signal line 15 is effective and the trace control circuit 20 outputs the high level store signal to the trace memory 14 through the store signal line 19. In the case of the emulator 10 shown in FIG. 3, the access generation instruction address, the operand address, the operand data, and the control signal are stored in the trace memory 14 as trace information through the signal lines 19A, 19B, 19C, and 19D. Therefore all types of information can be provided on the store signal line 19, and many kinds of store signals are transmitted with different timing on the store signal lines.

In the description for the first and the second embodiments shown in FIGS. 1 and 3, the relationship between the bus cycle and the clock cycle is not explained. The emulator operation can be easily controlled when the bus cycle comprises a plurality of clock cycles. For example, when one bus cycle has two clock cycles, the operand address is output at the first clock cycle and the access generation instruction address is provided at the second clock cycle. Further, high-speed elements are not required for the configuration of the emulator 10 when one bus cycle has more than two clock cycles.

In the emulator 20 of the second embodiment shown in FIG. 3, the access generation instruction address as the address information by which the operand access has been executed and the operand address are output on the address signal line 11, then provided to the trace memory 14 and the target system 30 through the address signal line 12 based on the time sharing method. However, these address signals are output through the other signal line such as the data signal line 8 shown in FIG. 1 or the data signal line 15 shown in FIG. 3. The data signal lines 8 and 15 are two-way signal lines. On the other hand, the address signal lines 11 and 12 are one-way signal lines. The data signal line can be provided to the emulator device for transferring the executed address signal and the operand address from the microprocessor by changing the timing of the output operation and the read operation, alternately. For example, the read operation is executed at the first clock timing and the write operation at the second clock timing when one bus cycle has two clock cycles.

Moreover, in the emulator 10 as the second embodiment shown in FIG. 3, the access generation instruction address is output to the emulator 10. However, a part of the instruction address or the difference between the access generation instruction address and a reference address can be used instead of the access generation instruction address when the relationship between the access generation instruction address and the reference address can be calculated correctly.

As described above, the trace information required for the real-time trace operation can be obtained without increasing the number of terminals in the microprocessor. Therefore the relationship between the access generation instruction address and the operand address transferred on the chip bus can be correctly known so that the microprocessor application system can be easily debugged.

The function for providing the relationship between the operand address and the access generation instruction address is required in the microprocessor 1 shown in FIGS. 1 and 3. However, the number of terminals is increased by only one.

Furthermore, in the emulator device 10 for emulating the microprocessor 1 shown in FIG. 3, the hold circuit for providing the address signal to the target system and the control circuit for controlling the selection signal and the hold signal are further required in addition to the configuration of the conventional emulator device. However, the circuit configuration of these circuits is uncomplicated so that very little additional hardware is required.

The benefit of the simplification in the software achieved by the introduction of the microprocessor of the present invention is considerably greater than the disadvantage caused by the increased hardware requirements.

The correct relationship between the executed instruction address and the operand address can be obtained based on the time sharing method by the microprocessor device and the emulator device as in the first and the second embodiments described above.

This invention can be applied to a microprocessor device in which data of a program counter (PC) can be obtained instead of the access generation instruction address described in the first and the second embodiments. In general, many program counters (PCs) are provided in a high-performance microprocessor corresponding to an instruction fetch unit, a decode unit, an operand control unit, an execution unit and the like. Only data (address) of a specified PC in the PCs can be output to an external device for debugging.

Figure 5:
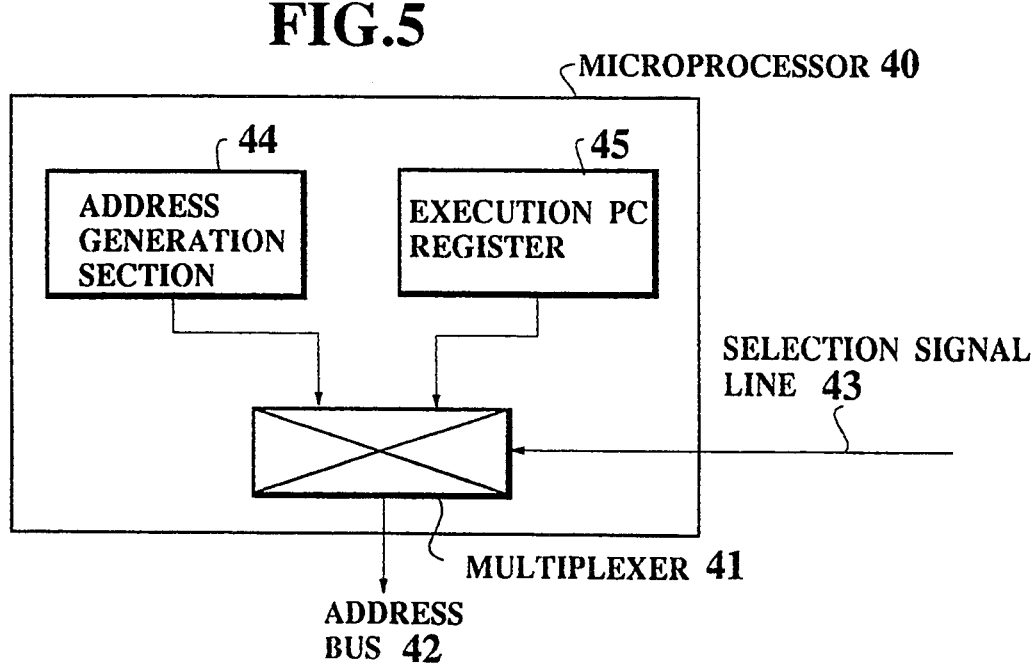
FIG. 5 is a block diagram of the configuration of a microprocessor device according to a third embodiment of the present invention.

A microprocessor device and emulator device having the function described above will now be explained referring to FIGS. 5 to 9. FIG. 5 is a block diagram of a configuration of a microprocessor device according to a third embodiment of the present invention.

Figure 6:
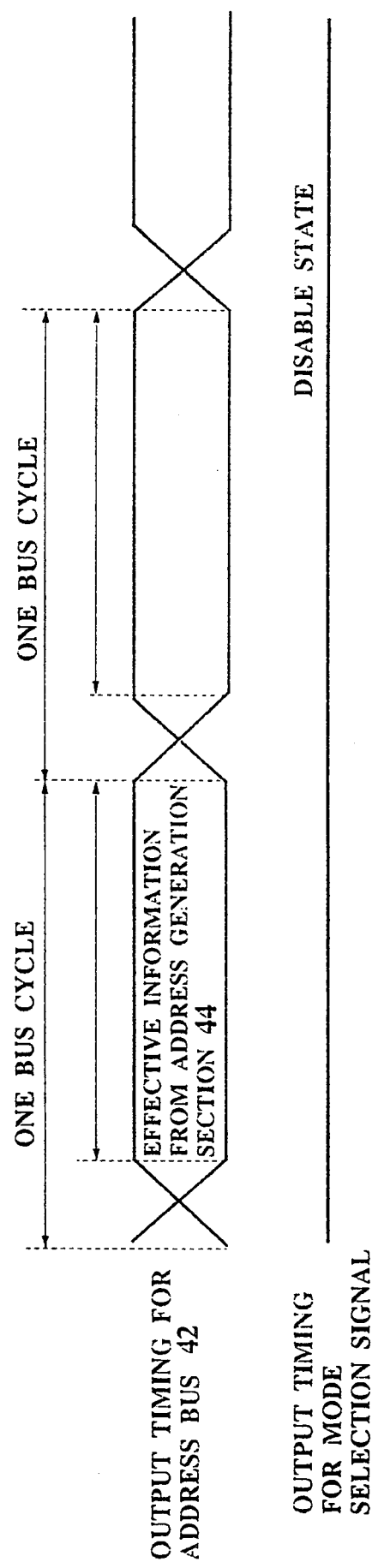
FIGS. 6 and 7 are timing charts showing the operation of the microprocessor shown in FIG. 5.
Figure 7:
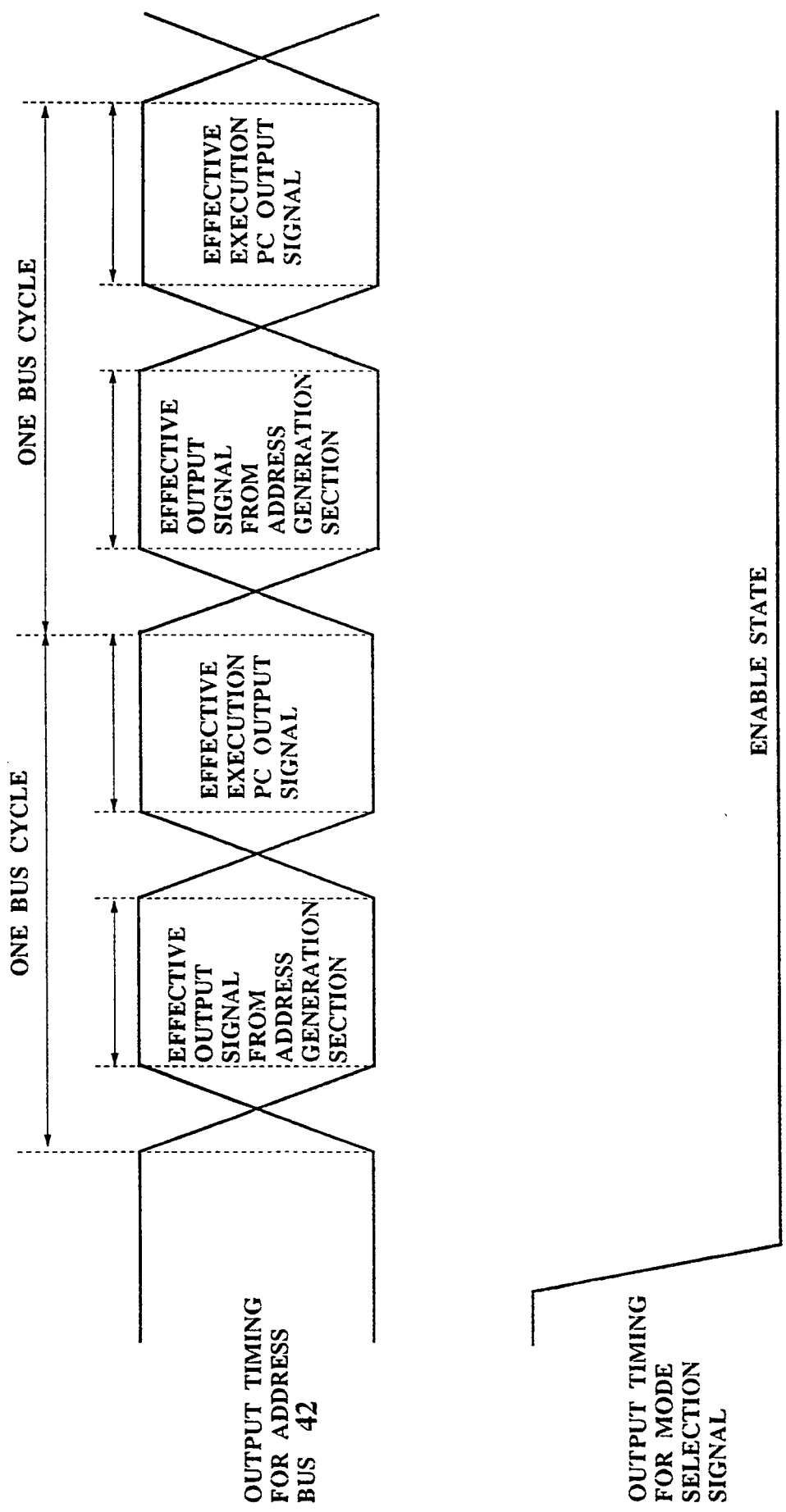

FIGS. 6 and 7 are timing charts showing the operation of the microprocessor shown in FIG. 5.

A microprocessor 40 uses the smallest bus cycle of two clock cycles and a bus cycle end signal (shown in FIG. 9) transferred through a bus cycle end signal line 74. In the same diagram, output data from an address generation section 44 and an execution PC register 45 are interleaved by a multiplexer 41, and then output to an address bus 42. The multiplexer 41 selects and then outputs either the output from the address generation section 44 or the output from the execution PC register 45 by the mode selection signal provided through a mode selection signal line 43. For example, as shown the timing chart in FIG. 6, only the data from the address generation section 44 is output through an address bus signal output line 72 (shown in FIG. 8) during one bus cycle when the mode selection signal is disabled at the high level. On the other hand, as shown by the timing chart in FIG. 7, the data from the address generation section 44 and the data from the execution PC register 45 is output alternately through the address bus signal output line 72 by the multiplexer 41 during a one-half ($\frac{1}{2}$) bus cycle when the mode selection signal is enabled at the low level.

Figure 8:
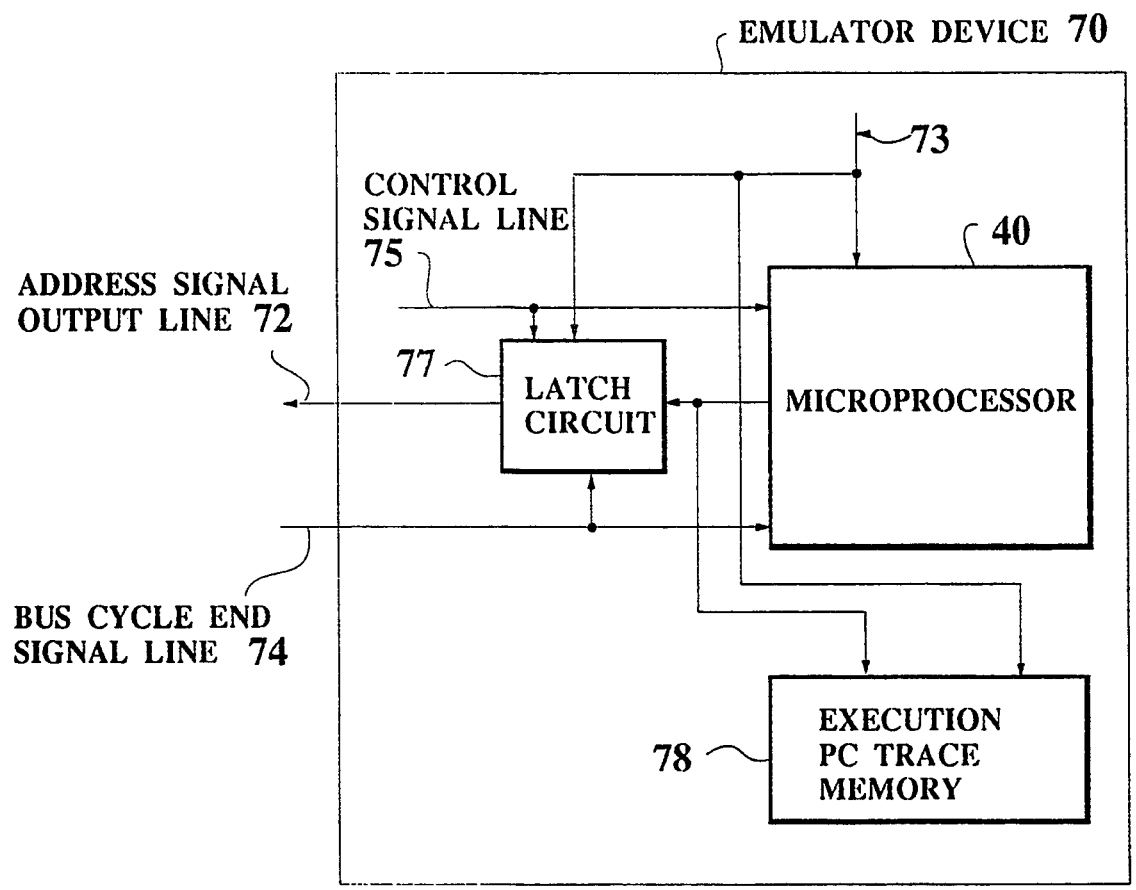
FIG. 8 is a block diagram of the configuration of an emulator device according to a fourth embodiment of the present invention.

FIG. 8 is a schematic block diagram of the configuration of an emulator as a fourth embodiment according to the present invention. The microprocessor of the third embodiment shown in FIG. 5 is incorporated in an emulator 70. Input/Output signals for the microprocessor 40 which is to be debugged are transferred to an input terminal of an application system such as an user board (not shown).

In the case of the emulator 70 incorporating the microprocessor 40 of the third embodiment, a latch circuit 77 is incorporated in the emulator 70. Thereby, the output timing in which the I/O signals for the microprocessor 40 are provided to the address bus signal line 72, which is connected to the user board (not shown), can be maintained while the mode selection signal 43 becomes disabled (high level). The memory address information from the address generation section 44 is maintained in the front bus cycle until the bus cycle end signal is received by the latch circuit 77. This timing is used as the address bus timing in the debugging mode for the user board. The operation for the latch circuit 77 can be controlled by the mode selection signal because the latch operation by the latch circuit 77 is required only when the mode selection signal is enabled (low level).

Figure 9:
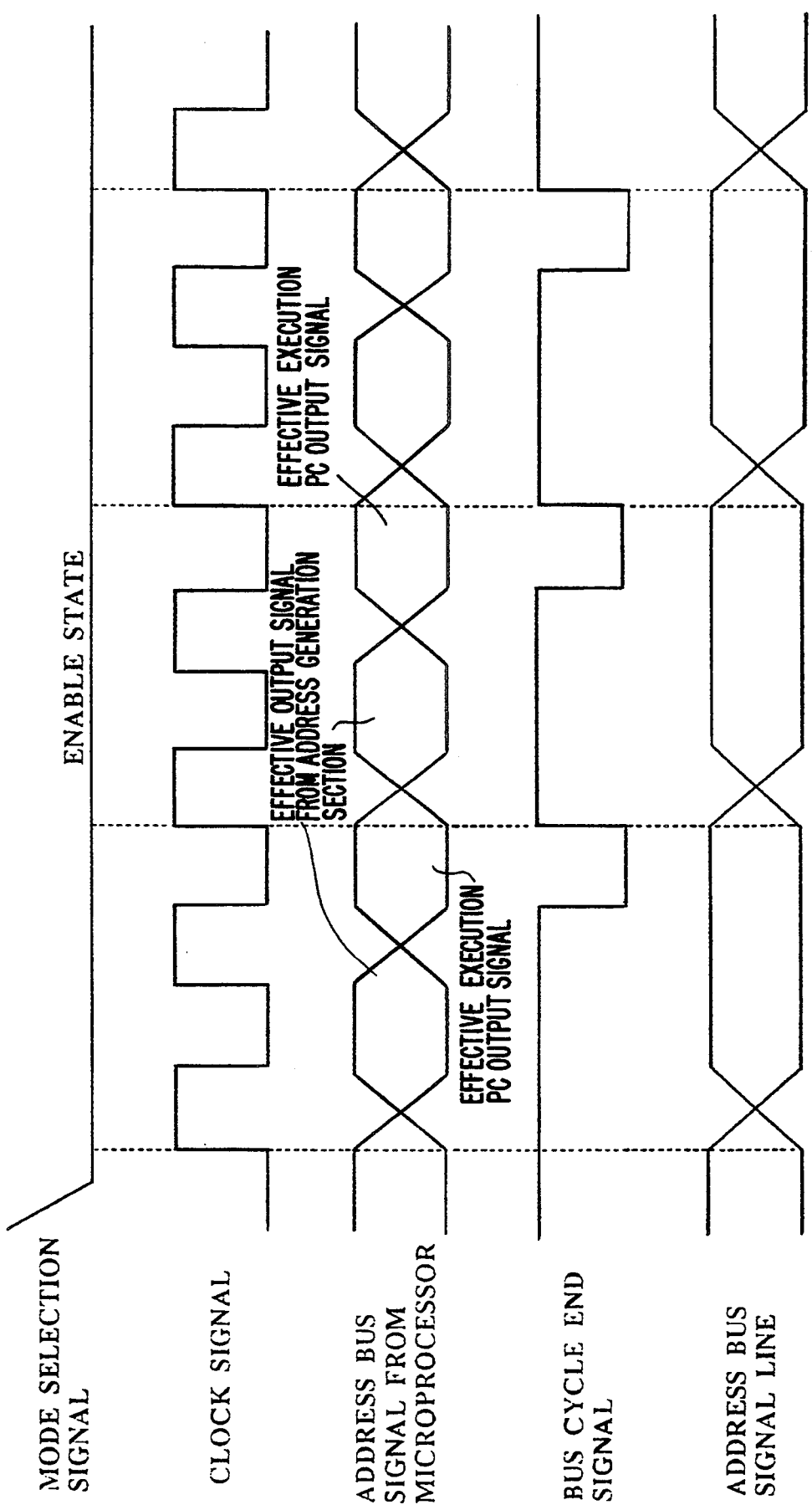
FIG. 9 is a timing chart showing the operation of the emulator shown in FIG. 5.

FIG. 9 is a timing chart of the operation of the emulator 70 shown in FIG. 8.

An execution PC trace memory 78 is used only for storing the executed PC address as the output signal transferred from the microprocessor 40 through the address signal bus 71 in synchronism with the bus cycle.

The execution PC trace memory 78 can receive the output data from the microprocessor 40 only when the mode selection signal is enabled (low level). Therefore the execution PC trace memory can be controlled by the mode selection signal in the same way like the latch circuit 77.

The execution PC trace memory 78 is used for storing the executed PC address information output from the microprocessor 40 to the user's board through the address signal output line 72. Therefore, the result of the real-time trace operation which is information about the actual instruction executed in the microprocessor 40 can be analyzed by comparing the executed PC address with the address bus information stored in a real-time trace section (not shown).

Various modifications will become possible for those skilled in the art after the teaching of the present disclosure without departing from the scope thereof.

What is claimed is:

1. A microprocessor device comprising:
    an operand address register for storing an operand access address for an operand access;
    an access generation instruction address register for storing an access generation instruction address corresponding to the operand access;
    an operand data register for storing input/output data for the address indicated by the operand address;
    selection means, controlled by a selection signal provided from a source external to the microprocessor, receiving the operand address output from the operand address register and the access generation instruction address output from the access generation instruction register and for outputting one of the operand address and the access generation instruction address as an output signal and wherein the selection means outputs the operand address as the output signal when the selection signal is in an enable state, and the selection means outputs the access generation instruction address corresponding to the operand access when the selection signal is in a disable state; and
    output means for outputting the output signal selected by the selection means to a device external to the microprocessor.

2. A microprocessor device according to claim 1, wherein the output means is an address pin.

3. A microprocessor device comprising:
    an operand address register for storing an operand access address for an operand access;
    an access generation instruction address register for storing an access generation instruction address corresponding to the operand access;
    an operand data register for storing input/output data for the address indicated by the operand address;
    selection means, controlled by a selection signal provided from a source external to the microprocessor, receiving the operand address output from the operand address register and the access generation instruction address output from the access generation instruction register and for outputting one of the operand address and the access generation instruction address as an output signal and wherein the selection means outputs the operand address as the output signal when the selection signal is in an enable state, and the selection means outputs the operand address and the access generation instruction address corresponding to the access operation as the output signal when the selection signal is in a disable state; and
    output means for outputting the output signal selected by the selection means to a device external to the microprocessor.

4. A microprocessor device comprising:
    an operand address register for storing an operand access address for an operand access;
    an access generation instruction address register for storing an access generation instruction address having caused the operand access;
    an operand data register for storing input/output data for the address indicated by the operand address;
    selection means, controlled by a selection signal provided from a source external to the microprocessor, receiving the operand data transferred from the operand data register and the access generation instruction address transferred from the access generation instruction register and outputting one of the operand data and the access generation instruction address as an output signal and wherein the selection means outputs the operand data as the output signal when the selection signal is in an enable state, and the selection means selects the access generation instruction address as the output signal when the selection signal is in a disable state; and
    output means for outputting the output signal selected by the selection means to outside of the microprocessor.

5. A microprocessor device according to claim 4, wherein the output means is an address pin.

6. A microprocessor device comprising:
    an operand address register for storing an operand access address for an operand access;
    an access generation instruction address register for storing an access generation instruction address having caused the operand access;
    an operand data register for storing input/output data for the address indicated by the operand address;
    selection means, controlled by a selection signal provided from a source external to the microprocessor, receiving the operand data transferred from the operand data register and the access generation instruction address transferred from the access generation instruction register and outputting one of the operand data and the access generation instruction address as an output signal and wherein the selection means outputs the operand data as the output signal when the selection signal is in an enable state, and the selection means outputs the operand data and the access generation instruction address as the output signal when the selection signal is in a disable state; and output means for outputting the output signal selected by the selection means to outside of the microprocessor.

7. An emulator device comprising: a microprocessor device including, an operand address register for storing an operand access address for an operand access, an access generation instruction address register for storing an access generation instruction address corresponding to the operand access, an operand data register for storing input/output data for the address indicated by the operand address, selection means, controlled by a selection signal provided form a source external to the microprocessor, receiving the operand data transferred from the operand data register and the access generation instruction address transferred from the access generation instruction register and outputting one of the operand data and the access generation instruction address as an output signal, and output means for outputting the output signal selected by the selection means to outside of the microprocessor;

hold means, connected to the address pin in the microprocessor, for holding the output data from the microprocessor through the address pin;

address output means connected to the hold means;

trace information storage means for storing the information transferred through the address pin and an input/output pin in the microprocessor for inputting/outputting the operand data, and the address output means as trace information during a real-time trace operation; and trace control means for generating the selection signal and for outputting the selection signal to the selection means in the microprocessor, for generating a hold signal and for outputting the hold signal to the hold means, and for generating a store signal and for outputting the store signal to the trace store means, wherein the hold means outputs the operand address to the address output means during both of the hold signal and the selection signal are in the enable state.

8. An emulator device comprising:

hold means for inputting an operand address transferred through an address pin in a microprocessor device incorporated in the emulator device during an emulation test operation, for temporarily holding the operand address for operand access;

trace information storage means for storing the operand address obtained through the address pin and an access generation instruction address corresponding to the operand access as trace information during a real-time trace operation; and trace control means for outputting a selection signal with a predetermined timing, for outputting a hold signal indicating a timing to store the operand address into the hold means, and for outputting a store signal indicating a timing to store the trace information, wherein the hold means stores an input signal and outputs the input signal when the selection signal is in the enable state and the hold signal changes to the disable state, and for withholding the input signal when the state of the hold signal changes to the enable state, and for holding the access generation instruction address as the microprocessor device during the selection signal and the hold signal are in the disable state.

9. A microprocessor device comprising:

an address generation section for generating an address for memory access operation;

an execution program counter (PC) register for indicating an execution PC to be executed in an arithmetic device;

a multiplexer for multiplexing either an output signal transferred from the address generation section or an output signal transferred from the execution PC register according to a selection signal provided from a source external to the microprocessor; and an address bus for outputting the output signal from the address generation section and the output signal from the execution PC register to a device external to the microprocessor based on control by the multiplexer, wherein the microprocessor outputs the output signal transferred from the address generation section when the selection signal in a disable state and outputs alternately the output signal from the address generation section and the output signal from the execution PC register by multiplexing them to the address bus when the selection signal is in an enable state.

10. A microprocessor according to claim 9, wherein the address generation section generates an operand address.

11. A microprocessor according to claim 9, wherein the address generation section generates an execution instruction address.

12. An emulator device comprising:

a microprocessor device including, an address generation section for generating an address for memory access operation, the address generator section generating an operand address, an execution program count (PC) register for indicating an execution PC to be executed in an arithmetic device, a multiplexer for multiplexing either an output signal transferred from the address generation section or an output signal transferred from the execution PC register according to a selection signal provided from a source external to the microprocessor, and an address bus for outputting the output signal from the address generation section and the output signal from the execution PC register to outside of the microprocessor based on control by the multiplexer, wherein the microprocessor outputs the output signal transferred from the address generation section when the selection signal in a disable state; and outputs alternately the output signal from the address generation section and the output signal from the execution PC register by multiplexing them to the address bus when the selection signal is in an enable state;

hold means for temporarily storing the output signal transferred through the address bus in the microprocessor device; and trace information store means for storing the output signal transferred from the address generation section and the execution PC register through the address bus as trace information during a real-time trace operation, wherein the operation of the hold means is controlled by a hold signal indicating a timing to store the hold information, and the operation of the trace store means is controlled by a store signal indicating a timing to store the trace information, the hold means holds the output signal and outputs the output signal when the selection signal is in the enable state and the hold signal changes to the disable state, the hold means withholds the output signal when the hold signal changes to the enable state, and the trace information store means stores the execution instruction address as the output signal transferred from the microprocessor device through the address bus when the selection signal and the store signal are in the disable state.

13. An emulator device comprising:

hold means for temporarily storing an output signal transferred from an address generation section through an address bus in a microprocessor device incorporated in the emulator during an emulation test operation; and trace information store means for storing the output signal transferred from the address generation section and from an execution PC register through the address bus as trace information during a real-time trace operation, wherein the operation of the hold means is controlled by a hold signal indicating a timing to store hold information, and the operation of the trace information store means is controlled by a store signal indicating a timing to store trace information, and wherein the hold means stores the output signal and outputs the output signal when the selection signal enters the enable state and when the hold signal enters the disable state, the hold means does not store the output signal when the hold signal enters the enable state, and the trace information store means stores the execution instruction address as the output signal transferred from the microprocessor device through the address bus when the selection signal and the store signal are in the disable state.

14. An emulator apparatus comprising:

a microprocessor including a first and a second internal register;

a multiplexer receiving inputs from the first and second registers and selectively outputting the contents of the first and second registers to a first bus as output information, the multiplexer being controlled by a select signal supplied external to the microprocessor;

a holding register receiving input from the first bus, the holding register storing the first output information according to a hold control signal and providing the stored first output information to a second bus;

a trace information memory device connected to the first and second buses and storing information from the first and second buses according to a trace store signal; and a control circuit outputting the select signal, the hold signal and the trace store signal, wherein during a first time period, the select signal is placed at a first logic level to output the contents of the first register to the first bus, the hold signal is a logic level to provide the contents of the first register to the second bus, and wherein during a second time period, the select signal is placed at a second logic level to output the contents of the second register onto the first bus and the hold signal is set to another logic level to provide the contents of the first register stored in the hold register to the second bus during the second time period, the trace control signal being activated to store the contents of the first and second buses into the trace control memory during the second time period.

* * * * *